US008236068B2

(12) United States Patent
Aramata et al.

(10) Patent No.: US 8,236,068 B2
(45) Date of Patent: Aug. 7, 2012

(54) SEPARATOR FOR NON-AQUEOUS SECONDARY BATTERY, MAKING METHOD, AND NON-AQUEOUS ELECTROLYTE SECONDARY BATTERY

(75) Inventors: Mikio Aramata, Annaka (JP); Meguru Kashida, Annaka (JP); Satoru Miyawaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/291,579

(22) Filed: Nov. 8, 2011

(65) Prior Publication Data

US 2012/0052192 A1 Mar. 1, 2012

Related U.S. Application Data

(62) Division of application No. 11/896,017, filed on Aug. 29, 2007, now abandoned.

(30) Foreign Application Priority Data

Aug. 30, 2006 (JP) .................. 2006-233579

(51) Int. Cl.
*H01M 2/14* (2006.01)
*H01M 2/16* (2006.01)
*B05D 5/12* (2006.01)

(52) U.S. Cl. ....... 29/623.5; 429/142; 429/251; 429/254; 29/623.4; 427/123

(58) Field of Classification Search .................. None
See application file for complete search history.

(56) References Cited

U.S. PATENT DOCUMENTS

| | | | |
|---|---|---|---|
| 5,162,176 | A | 11/1992 | Herr et al. |
| 6,403,262 | B1 | 6/2002 | Xing et al. |
| 2003/0215711 | A1 | 11/2003 | Aramata et al. |
| 2004/0002005 | A1 | 1/2004 | Gao et al. |
| 2005/0019663 | A1 | 1/2005 | Nanno et al. |
| 2005/0079420 | A1* | 4/2005 | Cho et al. .................. 429/231.95 |
| 2005/0244715 | A1 | 11/2005 | Cho et al. |

FOREIGN PATENT DOCUMENTS

| | | |
|---|---|---|
| JP | 5-067468 A | 3/1993 |
| JP | 9-283181 A | 10/1997 |
| JP | 11-086847 A | 3/1999 |
| JP | 3287376 B2 | 6/2002 |
| JP | 2004-303597 A | 10/2004 |
| JP | 2005-085508 A | 3/2005 |
| JP | 2005-317551 A | 11/2005 |
| WO | 2005-018030 A2 | 2/2005 |

* cited by examiner

*Primary Examiner* — Jonathan Crepeau
(74) *Attorney, Agent, or Firm* — Westerman, Hattori, Daniels & Adrian, LLP

(57) ABSTRACT

A separator carries lithium particles on its surface. Using the separator, a non-aqueous electrolyte secondary battery having a high initial efficiency and improved cycle retentivity is available.

15 Claims, No Drawings

SEPARATOR FOR NON-AQUEOUS SECONDARY BATTERY, MAKING METHOD, AND NON-AQUEOUS ELECTROLYTE SECONDARY BATTERY

CROSS-REFERENCE TO RELATED APPLICATION

This application is a divisional of U.S. application Ser. No. 11/896,017 filed on Aug. 29, 2007, now abandoned which claims priority under 35 U.S.C. §119(a) on patent application No. 2006-233579 filed in Japan on Aug. 30, 2006, the entire contents of which are hereby incorporated by reference.

TECHNICAL FIELD

This invention relates to a separator for non-aqueous secondary batteries; a method for preparing the same; and a non-aqueous electrolyte secondary battery. More particularly, it relates to a separator for lithium ion secondary batteries; a method for preparing the same; and a lithium ion secondary battery.

BACKGROUND ART

As the portable power source for laptop computers, mobile phones, digital cameras and the like, there is an increasing demand for lithium ion secondary batteries featuring a high energy density. A focus is also directed to lithium ion secondary batteries as the power source for electric automobiles which are desired to reach a practical level because of environment friendliness.

Conventional lithium ion secondary batteries use carbonaceous materials as the negative electrode active material. To meet the recent demand for higher capacities, it is envisioned that silicon and other metals capable of alloying with lithium and oxides thereof which are expected to provide a high charge/discharge capacity are used as the negative electrode active material. The use of alloying metals as the active material is expected to provide a high capacity, but can cause an irreversible phenomenon that once lithium in the positive electrode material is introduced into the negative electrode material during the first charging step, not all lithium ions are taken out during subsequent discharge, with a certain amount being left fixed within the negative electrode. This undesirably results in a battery having a decreased discharge capacity and a degraded capability.

One solution proposed for solving the problem is to previously incorporate a lithium source in a negative electrode material. The lithium source may take various forms including metallic lithium powder (JP-A 5-67468 or U.S. Pat. No. 5,162,176), metallic lithium foils (JP-A 11-86847, JP-A 2004-303597, JP-A 2005-85508), and lithium compounds (Japan Pat. 3287376 and JP-A 9-283181).

These approaches, however, are industrially unacceptable because the manufacture process lacks safety and the operation in an atmosphere where lithium remains non-reactive is cumbersome.

DISCLOSURE OF THE INVENTION

An object of the present invention is to provide a separator which is used to construct a non-aqueous secondary battery having a high initial efficiency and improved cycle retentivity and which is easy to handle; a method for preparing the same; and a non-aqueous electrolyte secondary battery.

The inventors have found that a separator can be prepared by a simple method and is easy to handle at a dew point of approximately −40° C., and more specifically, that when a separator carrying a surface-stabilized metallic lithium powder on its surface is used in a non-aqueous secondary battery, this lithium powder can compensate for an irreversible portion of lithium which would be left fixed within the negative electrode, leading to an improvement in battery capability.

In one aspect, the invention provides a separator carrying a lithium powder on its surface, the separator being for use in non-aqueous secondary batteries. In a preferred embodiment, the lithium powder is a surface stabilized metallic lithium powder. In a preferred embodiment, the lithium powder having an adherent surface is bound to the separator. In a preferred embodiment, the separator having the lithium powder bound thereto is obtained by applying an adherent lithium powder to a substrate having parting property, bringing the substrate in contact with a separator, and transferring the lithium powder to the separator.

In another aspect, the invention provides a non-aqueous electrolyte secondary battery comprising a separator as defined above; and specifically, a non-aqueous electrolyte secondary battery comprising a separator as defined above, a negative electrode comprising a negative electrode active material containing silicon and/or silicon oxide capable of intercalating and deintercalating lithium ions, a positive electrode comprising a positive electrode active material containing a lithium composite oxide or sulfide capable of intercalating and deintercalating lithium ions, and a non-aqueous electrolyte solution comprising a lithium salt.

In a further aspect, the invention provides a method for preparing a separator carrying a lithium powder on its surface for non-aqueous secondary batteries, the method comprising the steps of applying an adherent lithium powder to a substrate having parting property, bringing the substrate in contact with a separator, and transferring the lithium powder to the separator.

BENEFITS OF THE INVENTION

Using the separator of the invention, a non-aqueous electrolyte secondary battery having a high initial efficiency and improved cycle retentivity is available.

DESCRIPTION OF THE PREFERRED EMBODIMENT

In one aspect of the invention, the separator for use in non-aqueous secondary batteries carries a lithium powder on its surface. That is, lithium particles are distributed on a surface of a separator. In another aspect, the invention provides a non-aqueous electrolyte secondary battery comprising a separator carrying a lithium powder on its surface. Specifically, the non-aqueous electrolyte secondary battery comprises a separator as defined herein, a negative electrode comprising a negative electrode active material containing silicon and/or silicon oxide capable of intercalating and deintercalating lithium ions, a positive electrode comprising a positive electrode active material containing a lithium composite oxide or sulfide capable of intercalating and deintercalating lithium ions, and a non-aqueous electrolyte solution comprising a lithium salt.

In the non-aqueous electrolyte secondary battery, the metallic lithium powder on the surface of the separator is gradually dissolved into the electrolyte solution during repetitive charge/discharge cycles, and eventually incorporated such that the negative electrode is doped therewith, that is, utilized to compensate for an irreversible capacity component in the negative electrode. Because the metallic lithium powder on the separator surface is utilized to compensate for an irreversible capacity component in the negative electrode, the amount of the metallic lithium powder added is desirably less than or equal to an amount sufficient to compensate for an irreversible capacity component in the negative electrode. An appropriate amount of the metallic lithium powder added varies with the quantity and type of the negative electrode active material, and the irreversible capacity component is reduced in proportion to the amount of lithium powder. A too much amount of lithium powder would allow lithium to precipitate on the negative electrode and rather reduce the battery capacity. Accordingly, an appropriate amount of lithium added is preferably determined after an initial efficiency of the negative electrode is separately measured.

The particle size of the metallic lithium powder (i.e., particles) is not particularly limited. In view of a possible thin uniform distribution, a lithium powder with an average particle size of 0.1 to 50 µm, and especially 1 to 10 µm is preferred. It is noted that the average particle size is determined as a weight average diameter $D_{50}$ (particle diameter at 50% by weight cumulative, or median diameter) using, for example, a particle size distribution measuring instrument relying on laser diffractometry or the like. The metallic lithium powder used herein is preferably a stabilized one. Once a lithium powder is stabilized, the lithium powder is no longer altered even in a dry chamber with a dew point of approximately −40° C. The stabilization of lithium powder means that a surface of a lithium powder (i.e., surfaces of lithium particles) is coated with substances having environment stability including organic rubbers such as nitrile-butadiene rubber (NBR) and styrene-butadiene rubber (SBR), organic resins such as ethylene-vinyl alcohol (EVA) copolymer resins, and inorganic compounds such as metal carbonates like $Li_2CO_3$. Such stabilized lithium powder is commercially available, for example, from FMC Corp. under the trade name SLMP.

The separator carrying lithium powder on its surface is disposed between positive and negative electrodes. The separator may be formed of any suitable material having a liquid holding ability. Typically, porous sheets and non-woven fabrics of polyolefins such as polyethylene and polypropylene are used.

The preferred method for distributing lithium powder on a separator surface involves imparting adherence to a surface of lithium powder (i.e., surfaces of lithium particles), especially stabilized lithium powder, then bringing the lithium powder in contact with a separator for adhesively binding the powder to the separator. Adherence is imparted to the lithium powder surface by immersing the lithium powder in a binder or adhesive for coating the surface with the binder, and taking the powder out of the binder. While the coating amount of the binder on the particle surface varies with the binding force of the binder, it may suffice to impart a binding or adhesive force sufficient to prevent lithium particles from separating from the separator surface during the manufacture process after the lithium particles are bound to the separator surface. If the coating amount of the binder is beyond the necessity, then the dissolution of lithium into the electrolyte solution takes a time, and the binder can also be dissolved to interfere with battery performance. Specifically, the coating amount of the binder on the lithium powder is preferably about 0.01 to about 10% by weight, and more preferably about 0.1 to about 5% by weight.

Suitable binders or adhesives include acrylic binders, rubber based binders, and silicone based binders, as well as hot melt adhesives. Those binders which are dissolvable in components of the electrolyte solution are preferred.

When the lithium powder is immersed in the binder, use of a dilution of the binder with an organic solvent is preferred for uniform surface coating and easy control of the coating amount.

Next, the lithium powder immersed in the binder, specifically a dilution of the binder in a solvent is bound to a separator. First, the lithium powder following immersion in the binder is applied to a surface of a substrate having parting property, by any suitable technique such as coating or spraying. The coating is dried to remove the dilution solvent. The substrate carrying the lithium powder is press joined to a separator such that the powder-carrying surface is in contact with the separator, for thereby transferring the lithium powder from the substrate surface to the separator surface. In case a hot melt adhesive is used, the lithium powder-carrying substrate surface must be heated at a predetermined temperature so that a binding force is exerted.

Suitable substrates having parting property include polyethylene terephthalate (PET) film, polypropylene (PP) film, polyethylene-laminated paper, and other substrates, which are coated with silicone parting agents.

If the substrate has insufficient parting property, the transfer of the lithium powder to the separator surface is prohibited during pressure joining between the substrate and the separator. Inversely, if the parting property is beyond the necessity, the lithium powder would separate off from the substrate before the pressure joining.

The positive electrode active materials used in the non-aqueous electrolyte secondary battery of the invention include oxides and sulfides which are capable of intercalating and deintercalating lithium ions. They may be used alone or in admixture. Examples include sulfides and oxides of metals excluding lithium such as $TiS_2$, $MoS_2$, $NbS_2$, $ZrS_2$, $VS_2$, $V_2O_5$, $MoO_3$, $Mg(V_3O_8)_2$, and lithium and lithium-containing complex oxides. Composite metals such as $NbSe_2$ are also useful. For increasing the energy density, lithium complex oxides based on $Li_xMetO_2$ are preferred wherein Met is preferably at least one element of cobalt, nickel, iron and manganese and x is a positive number in the range: $0.05 \leq x \leq 1.10$. Illustrative examples of the lithium complex oxides include $LiCoO_2$, $LiNiO_2$, $LiFeO_2$, and $Li_xNi_yCo_{1-y}O_2$ having a layer structure wherein x is as defined above and y is a positive number in the range: $0<y<1$, $LiMn_2O_4$ having a spinel structure, and rhombic $LiMnO_2$. Also used is a substitutional spinel type manganese compound adapted for high voltage operation which is $LiMet_xMn_{1-x}O_4$ wherein Met is titanium, chromium, iron, cobalt, copper, zinc or the like.

It is noted that the lithium complex oxide described above is prepared, for example, by grinding and mixing a carbonate, nitrate, chloride or hydroxide of lithium and a carbonate, nitrate, oxide or hydroxide of a transition metal in accordance with the desired composition, and firing at a temperature in the range of 600 to 1,000° C. in an oxygen atmosphere.

Organic materials may also be used as the positive electrode active material. Examples include polyacetylene, polypyrrole, polyparaphenylene, polyaniline, polythiophene, polyacene, and polysulfide.

The negative electrode active materials used in the non-aqueous electrolyte secondary battery of the invention include silicon-containing active materials capable of intercalating and deintercalating lithium ions. Examples include high purity silicon powder having metal impurity concentrations of up to 1 ppm; silicon powder of chemical grade which is obtained by washing with hydrochloric acid, and treating with hydrofluoric acid or a mixture of hydrofluoric acid and nitric acid for removing metal impurities; silicon powder obtained by metallurgically purifying metallic silicon and powdering; alloys of the foregoing, lower oxides or partial oxides of silicon, nitrides or partial nitrides of silicon, mixtures of the foregoing with carbon materials for electric conductive treatment, alloy forms of the foregoing by mechanical alloying, forms of the foregoing coated with conductive substances such as metals by sputtering or plating, and forms of the foregoing having carbon deposited thereon from organic gases. These active materials have a high charge/discharge capacity as compared with commonly used graphite, but allow a certain amount of lithium to contribute to an irreversible capacity in that lithium which is introduced into the negative electrode material during the first charging step is not entirely taken out during discharge, with a certain amount being left within the negative electrode. In particular, silicon oxide which is a lower oxide of silicon displays good cycle characteristics, but allows a larger amount of lithium to contribute to an irreversible capacity. This problem must be overcome before silicon oxide can be used in practice. The problem is overcome using the separator carrying lithium particles on its surface. Then, the above-mentioned silicon-containing active materials, especially silicon, silicon oxide represented by SiOx wherein $0.6 \leq x < 1.6$, particles of composite structure wherein silicon fines are dispersed in a silicon compound such as silicon dioxide, and forms of the foregoing which are coated with conductive coatings of carbon or the like can be advantageously used as the negative electrode active material.

Any desired method may be used in the preparation of positive and negative electrodes. Electrodes are generally prepared by adding an active material, binder, conductive agent and the like to a solvent to form a slurry, applying the slurry to a current collector sheet, drying and press bonding. The binder used herein is usually selected from polyvinylidene fluoride, polytetrafluoroethylene, styrene-butadiene rubber, isoprene rubber, and various polyimide resins. The conductive agent used herein is usually selected from carbonaceous materials such as graphite and carbon black, and metal materials such as copper and nickel. As the current collector, aluminum and aluminum alloys are usually employed for the positive electrode, and metals such as copper, stainless steel and nickel and alloys thereof employed for the negative electrode.

The non-aqueous electrolytic solution used herein comprises an electrolyte salt and a non-aqueous solvent. Exemplary of the electrolyte salt used herein are light metal salts. Suitable light metal salts include salts of alkali metals such as lithium, sodium and potassium, salts of alkaline earth metals such as magnesium and calcium, and aluminum salts. A choice may be made among these salts and mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5\text{-}(CF_3)_2C_6F_3)_4BLi$, $LiCF_3$, $LiAlCl_4$, and $C_4BO_8Li$, which may be used alone or in admixture.

From the electric conductivity aspect, the electrolyte salt is preferably present in a concentration of 0.5 to 2.0 mole/liter of the non-aqueous electrolytic solution. The electrolyte should preferably have a conductivity of at least 0.01 S/m at a temperature of 25° C., which may be adjusted in terms of the type and concentration of the electrolyte salt.

The non-aqueous solvent used herein is not particularly limited as long as it can serve for the non-aqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolane, sulfolane, methylsulfolane, acetonitrile, propionitrile, anisole, acetic acid esters, e.g., methyl acetate and propionic acid esters. It is desirable to use a mixture of an aprotic high-dielectric-constant solvent and an aprotic low-viscosity solvent in a proper ratio. It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing non-aqueous solvent.

Where a solid electrolyte or gel electrolyte is desired, a silicone gel, silicone polyether gel, acrylic gel, acrylonitrile gel, poly(vinylidene fluoride) or the like may be included in a polymer form. These ingredients may be polymerized prior to or after casting. They may be used alone or in admixture.

If desired, various additives may be added to the non-aqueous electrolytic solution of the invention. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid anhydrides, nitrogen- and sulfur-containing compounds for acid removal and water removal purposes.

The secondary battery may take any desired shape. In general, the battery is of the coin type wherein electrodes and a separator, all punched into coin shape, are stacked, or of the cylinder type wherein electrode sheets and a separator are spirally wound.

EXAMPLE

Examples and Comparative Examples are given below for further illustrating the invention, but are not construed as limiting the invention thereto. All percents are by weight.

Example 1

[Preparation of Separator Carrying Lithium Particles on Surface]

A silicone binder KR-101 (Shin-Etsu Chemical Co., Ltd.) was let down with toluene to a solids concentration of 0.1% to form 1,000 ml of a treating binder solution. A stabilized lithium powder having an average particle size of 20 μm (FMC Corp.), 10 g, was immersed in the solution, which was agitated for 10 minutes.

A PET film coated with silicone base parting agent X-70-201 (Shin-Etsu Chemical Co., Ltd.) was used as a substrate having parting property. The lithium powder which had been treated with the binder was coated onto the parting surface of the substrate by a doctor blade technique and dried in vacuum for toluene removal.

A separator in the form of a porous polyethylene film having a thickness of 30 μm was pressed against the lithium powder-carrying surface of the substrate. Upon removal of the substrate, the lithium powder was entirely transferred to the separator surface, yielding a separator having the lithium powder adhesively bound to its surface.

From a weight gain of the separator before and after the application of lithium powder, the amount of binder-treated lithium powder coated was calculated to be 0.4 mg per 2032 coin battery.

[Preparation of Negative Electrode Active Material (Conductive Silicon Composite)]

A powder mixture of equimolar amounts of silicon dioxide powder and metallic silicon powder was heat treated in a hot vacuum atmosphere at 1,350° C. and 0.1 Torr while evolving SiO gas was fed into a water-cooled tank for precipitation. The precipitate was milled in hexane on a ball mill, obtaining a silicon oxide powder (SiOx, x=1.02) having D50=8 μm. The powder was analyzed by X-ray diffractometry using Cu-Kα ray, finding that it consisted of amorphous silicon oxide (SiOx) particles. The silicon oxide powder was placed in a rotary kiln reactor, where disproportionation of silicon oxide and thermal CVD were concurrently effected in a methane/argon gas mixture stream at 1,150° C. for 2 hours, yielding a black powder. The black powder recovered had a deposited carbon content of 22.0%. On X-ray diffractometry analysis of the black powder, unlike the silicon oxide powder, a diffraction peak attributable to Si(111) appeared around 2θ=28.4°. Crystal size determination by the Scherrer equation from the half-value width of the diffraction peak showed that silicon grains dispersed in silicon dioxide had a size of 11 nm. This implies that a conductive silicon composite powder having submicron silicon (Si) grains dispersed in silicon dioxide ($SiO_2$) was obtained.

[Preparation of Negative Electrode]

A negative electrode was prepared by adding 10% of polyimide to the conductive silicon composite powder and further adding N-methylpyrrolidone to form a slurry. The slurry was coated onto a copper foil of 20 μm thick and vacuum dried at 80° C. for 1 hour. The coated foil was shaped under pressure by means of a roller press and vacuum dried at 350° C. for 1 hour, obtaining a negative electrode.

[Preparation of Positive Electrode]

From a single layer sheet using $LiCoO_2$ as the active material and an aluminum foil as the current collector (trade name Pioxcel C-100 by Pionics Co., Ltd.), a disc of 2 $cm^2$ was punched out as a positive electrode.

[Determining Capacities of Positive and Negative Electrodes in Cell]

To determine the capacity of positive and negative electrodes obtained above, a cell was constructed using lithium as a counter electrode. Specifically, a testing 2032 type cell was assembled in a glove box (dew point up to −80° C.), using metallic lithium, a separator, a positive electrode, and a non-aqueous electrolyte solution of lithium hexafluorophosphate as a non-aqueous electrolyte in a 1/1 (volume ratio) mixture of ethylene carbonate and diethyl carbonate in a concentration of 1 mole/liter. The cell was held at room temperature over night. A test was carried out using a secondary battery charge/discharge tester (Nagano Co., Ltd.). The test cell was charged with a constant current flow of 0.5 mA/$cm^2$ until a cell voltage of 4.2 V was reached. The charge capacity at this point is an initial capacity. Discharge was effected with a constant current flow of 0.5 mA/$cm^2$ and terminated when the cell voltage declined below 2.5 V. A discharge capacity was measured, and a positive capacity determined. The positive electrode was found to have a charge capacity of 4.6 mAh, a discharge capacity of 4.5 mAh, an initial efficiency of 98%, and an irreversible capacity of 0.1 mAh.

Similarly, a testing 2032 type cell was assembled using metallic lithium, a separator, a negative electrode, and a non-aqueous electrolyte solution of lithium hexafluorophosphate as a non-aqueous electrolyte in a 1/1 (volume ratio) mixture of ethylene carbonate and diethyl carbonate in a concentration of 1 mole/liter. The test cell was charged with a constant current flow of 0.5 mA/$cm^2$ until a cell voltage of 0.005 V was reached. The charge capacity at this point is an initial capacity. Discharge was effected with a constant current flow of 0.5 mA/$cm^2$ and terminated when the cell voltage exceeded 2.0 V. A discharge capacity was measured, and a negative capacity determined. The negative electrode was found to have a charge capacity of 6.0 mAh, a discharge capacity of 4.5 mAh, an initial efficiency of 75%, and an irreversible capacity of 1.5 mAh.

[Evaluation of Battery Using Lithium-Carrying Separator]

A testing 2032 type coin battery was assembled in a glove box (dew point up to −80° C.), using a separator having lithium powder bound to its surface as prepared above, a negative electrode, a positive electrode, and a non-aqueous electrolyte solution of lithium hexafluorophosphate as a non-aqueous electrolyte in a 1/1 (volume ratio) mixture of ethylene carbonate and diethyl carbonate in a concentration of 1 mole/liter.

The lithium ion secondary battery was held at room temperature over night. A test was carried out using a secondary battery charge/discharge tester (Nagano Co., Ltd.). The battery was charged with a constant current flow of 0.5 mA/$cm^2$ until a cell voltage of 4.2 V was reached. The charge capacity at this point is an initial capacity. Discharge was effected with a constant current flow of 0.5 mA/$cm^2$ and terminated when the cell voltage declined below 2.5 V. A discharge capacity was determined. The charge/discharge cycle was repeated. The ratio (%) of charge capacity to discharge capacity at the first cycle is the initial efficiency. To evaluate cycle performance, a ratio of a maximum discharge capacity among several charge/discharge cycles to a discharge capacity after 50 cycles was determined and reported as cycle retentivity. As a result, the initial efficiency was 88%, and the cycle retentivity was 95%.

Comparative Example 1

A testing 2032 type coin battery of the same construction as in Example 1 was assembled except that a porous polyethylene film of 30 μm thick not carrying a lithium powder on its surface was used as the separator. It was tested as in Example 1. As a result, the initial efficiency was 72%, and the cycle retentivity was 95%.

Example 2

[Preparation of Separator Carrying Lithium Particles on Surface]

An acrylic binder BPS-2411 (Toyo Ink Co., Ltd.) was let down with toluene to a solids concentration of 0.1% to form 1,000 ml of a treating binder solution. A stabilized lithium powder having an average particle size of 20 μm (FMC Corp.), 10 g, was immersed in the solution, which was agitated for 10 minutes.

A PET film coated with silicone parting agent KS-837 (Shin-Etsu Chemical Co., Ltd.) was used as a substrate having parting property. The lithium powder which had been treated with the binder was coated onto the parting surface of the substrate by a doctor blade technique and dried in vacuum for toluene removal.

A separator in the form of a porous polyethylene film having a thickness of 30 μm was pressed against the lithium powder-carrying surface of the substrate. Upon removal of the substrate, the lithium powder was entirely transferred to the separator surface, yielding a separator having the lithium powder adhesively bound to its surface.

From a weight gain of the separator before and after the application of lithium powder, the amount of binder-treated lithium powder coated was calculated to be 0.4 mg per 2032 coin battery.

[Evaluation of Battery Using Lithium-Carrying Separator]

A testing 2032 type coin battery of the same construction as in Example 1 was assembled except that the separator having a lithium powder bound to its surface as above was used. It was tested as in Example 1. As a result, the initial efficiency was 87%, and the cycle retentivity was 95%.

Example 3

A testing 2032 type coin battery of the same construction as in Example 1 was assembled. The separator used was a separator having a lithium powder bound to its surface in Example 1. A negative electrode was prepared by using the negative electrode active material (conductive silicon composite powder) prepared in Example 1, adding 10% of polyvinylidene fluoride thereto and further adding N-methylpyrrolidone to form a slurry, coating the slurry to a copper foil of 20 μm thick, vacuum drying at 120° C. for 1 hour, and pressure shaping on a roller press. The remaining components were the same as in Example 1. The battery was tested as in Example 1. As a result, the initial efficiency was 89%, and the cycle retentivity was 75%.

Comparative Example 2

A testing 2032 type coin battery of the same construction as in Example 3 was assembled except that a porous polyethylene film of 30 μm thick not carrying a lithium powder on its surface was used as the separator. It was tested as in Example 1. As a result, the initial efficiency was 73%, and the cycle retentivity was 71%.

Example 4

A testing 2032 type coin battery of the same construction as in Example 1 was assembled. The separator having a lithium powder bound to its surface in Example 2 and the negative electrode prepared in Example 3 were used. The remaining components were the same as in Example 1. The battery was tested as in Example 1. As a result, the initial efficiency was 87%, and the cycle retentivity was 75%.

Japanese Patent Application No. 2006-233579 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a separator carrying a lithium powder on its surface for non-aqueous secondary batteries, comprising the steps of:
applying the adherent lithium powder to a substrate having parting property,
bringing the substrate in contact with a separator, and transferring the lithium powder to the separator,
wherein the substrate having parting property is polyethylene terephthalate (PET) film, polypropylene (PP) film or polyethylene-laminated paper.

2. The method of claim 1, wherein the separator is a porous sheet of polyolefin.

3. A method for preparing a separator carrying a lithium powder on its surface for non-aqueous secondary batteries, comprising the steps of:
coating the lithium powder with adhesive,
then, applying the adherent lithium powder obtained by said coating step to a substrate having parting property,
followed by bringing the substrate having parting property into contact with a separator, and
transferring the adherent lithium powder from the substrate having parting property to the separator,
wherein the substrate having parting property is polyethylene terephthalate (PET) film, polypropylene (PP) film or polyethylene-laminated paper.

4. The method of claim 3, wherein the adhesive is selected from the group consisting of acrylic binders, rubber based binders, silicone based binders and hot melt adhesives.

5. The method of claim 3, wherein the adhesive is selected from silicone based binders.

6. The method of claim 3, wherein the coating step further comprises immersing the lithium powder in a dilution of the selected adhesive with an organic solvent, and then taking the lithium powder out of the dilution.

7. The method of claim 3, wherein the amount of the adhesive coating the lithium powder is 0.01 to 10% by weight based on the lithium powder.

8. The method of claim 3, wherein the separator is a porous sheet of polyolefin.

9. A method for preparing a separator carrying a stabilized metallic lithium powder on its surface for non-aqueous secondary batteries, comprising the steps of:
coating the stabilized metallic lithium powder with adhesive,
then, applying the adherent stabilized metallic lithium powder obtained by said coating step to a substrate having parting property,
followed by bringing the substrate having parting property into contact with a separator, and
transferring the adherent stabilized metallic lithium powder from the substrate having parting property to the separator,
wherein the substrate having parting property is polyethylene terephthalate (PET) film, polypropylene (PP) film or polyethylene-laminated paper.

10. The method of claim 9, wherein the stabilized metallic lithium powder is a lithium powder that is surface coated with substances selected from the group consisting of nitrile-butadiene rubber (NBR), styrene butadiene rubber (SBR), ethylene-vinyl alcohol (EVA) copolymer resins and $Li_2CO_3$.

11. The method of claim 9, wherein the adhesive is selected from the group consisting of acrylic binders, rubber based binders, silicone based binders and hot melt adhesives.

12. The method of claim 9, wherein the adhesive is selected from silicone based binders.

13. The method of claim 9, wherein the coating step further comprises immersing the stabilized metallic lithium powder in a dilution of the selected adhesive with an organic solvent, and then taking the stabilized metallic lithium powder out of the dilution.

14. The method of claim 9, wherein the amount of the adhesive coating the stabilized metallic lithium powder is 0.01 to 10% by weight based on the stabilized metallic lithium powder.

15. The method of claim 9, wherein the separator is a porous sheet of polyolefin.

* * * * *